United States Patent
Wu et al.

(10) Patent No.: US 7,808,672 B2
(45) Date of Patent: Oct. 5, 2010

(54) IMAGE FORMING DEVICE AND IMAGE FORMATION CONTROL METHOD

(75) Inventors: Qingsu Wu, Ebina (JP); Masatoshi Tagawa, Ebina (JP); Masayoshi Sakakibara, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1286 days.

(21) Appl. No.: 10/376,625

(22) Filed: Mar. 3, 2003

(65) Prior Publication Data

US 2004/0066530 A1  Apr. 8, 2004

(30) Foreign Application Priority Data

Oct. 4, 2002  (JP)  ............... 2002-292966

(51) Int. Cl.
*G06K 15/00*  (2006.01)
(52) U.S. Cl. ............. 358/1.18; 358/1.15; 358/1.13; 358/1.6
(58) Field of Classification Search .......... 358/1.13, 358/1.15, 1.16, 1.17, 1.18, 1.6
See application file for complete search history.

(56) References Cited

U.S. PATENT DOCUMENTS

| | | | | |
|---|---|---|---|---|
| 5,988,899 | A * | 11/1999 | Benson et al. ............. 400/61 |
| 6,181,432 | B1 * | 1/2001 | Furuya ................. 358/1.11 |
| 6,222,634 | B1 | 4/2001 | Dubbels et al. |
| 6,236,463 | B1 * | 5/2001 | Cyman et al. ............ 358/1.14 |
| 6,542,255 | B1 * | 4/2003 | Nakamura ............... 358/1.17 |
| 6,781,711 | B1 * | 8/2004 | Rijavec et al. ............ 358/1.2 |
| 6,856,422 | B1 * | 2/2005 | Higashibata et al. ....... 358/1.18 |
| 2002/0030849 | A1 | 3/2002 | Takamiya |
| 2002/0060802 | A1 * | 5/2002 | Hino ................... 358/1.13 |
| 2004/0205568 | A1 * | 10/2004 | Breuel et al. ............. 715/513 |

FOREIGN PATENT DOCUMENTS

| | | |
|---|---|---|
| CN | 1245928 A | 3/2000 |
| EP | 0 851 367 A1 | 7/1998 |
| EP | 0 974 892 A2 | 1/2000 |
| EP | 0 977 130 A1 | 2/2000 |
| EP | 1 199 861 A2 | 4/2000 |
| GB | 2 249 993 A | 5/1992 |
| JP | A 10-74265 | 3/1998 |
| JP | A-2000-039972 | 2/2000 |
| JP | 2001-092615 A | 4/2001 |
| JP | A-2002-091715 | 3/2002 |
| JP | A-2002-202861 | 7/2002 |

* cited by examiner

*Primary Examiner*—Edward L Coles
*Assistant Examiner*—Vu B Hang
(74) *Attorney, Agent, or Firm*—Oliff & Berridge, PLC (57) ABSTRACT

An image forming device for printing a page which incorporates content data acquired from a reference destination, capable of starting printing earlier. A display analyzing section (33) analyzes a printing document and lays out a document element for tentative page dividing. In the laying out, for a document element whose content data needs to be acquired from a reference destination, a tentative size is used and, for a document element having content data of a known rendering size, the rendering size is used. A document manager (45) monitors a state of acquisition of the content data and instructs a rendering section (34), upon detection of completion of acquisition of content data to be laid out on a first page, to render the image of the page.

24 Claims, 11 Drawing Sheets

```
<html xmlns="http://www.w3.org/1999/xhtml">
<head>
 <title>Business Card Format Print</title>

</head>
 <body>
 <h3><pre>  Subject: alphabet</pre></h3>  ←402
  <pre>From:<span style="color:blue"> <aaa@xxx.co.jp></span></pre> ←404
  <pre>To:<span style="color:blue"> <bbb@xxx.co.jp></span></pre>  ←406
  <pre> </pre>
   <img src="http://www.fujixerox.co.jp/pict1.jpg" /> ←408
  <pre>abcde</pre>         ←————————— 410
   <img src="http://www.fujixerox.co.jp/pict2.jpg" /> ←412
  <pre>fghij</pre>          ←————————— 414
   <img src="http://www.fujixerox.co.jp/pict3.jpg" /> ←416
  <pre>klmno</pre>          ←————————— 418
</body>
</html>
```

Fig. 4

```
Content-Type: application/vnd.pwg.multiplexed; type="application/vnd.pwg-xhtml-print+xml: 1.0"

CHK 1 552 MORE
Content-ID: <804.23xxx@foo.com>
Content-Type: application/vnd.pwg-xhtml-print+xml: 1.0
Content-Disposition: inline <?xml version="1.0"?>
<!DOCTYPE html PUBLIC "-//PWG//DTD XHTML-Print 1.0//EN"
"http://www.pwg.org/xhtml-print/xhtml-print10.dtd">
<html xmlns="http://www.w3.org/1999/xhtml">
<head>
  <title>VMessage Mail Print</title>
</head>
  <body>
  <h3><pre>  Subject: Picture of my PC</pre></h3>       ←512
    <pre>I send you a picture of my PC. </pre>  ←514
    <pre> </pre>
    <img src="cid:804.46xxx@foo.com"/>   ←516
    <img src="http://foo.com/images/image3.jpeg"/>  ←518
```

510 { ... }

```
CHK 2 2070 LAST                                ←522
Content-ID: <804.46xxx@foo.com>
Content-Location: http://foo.com/images/image2.jpeg    }521
Content-Type: image/jpeg
Content-Transfer-encoding: base64
Content-Disposition: attachment /9j/xAGiAAABBQEBAQEBAQAAAAAAAAAAAQIDBAUGBwgJCgsBAAMBAQEBAQEBAQEAAAAA
AAABAgMEBQYHCAkKCxAAAgEDAwIEAwUFBAQAAAF9AQIDAAQRBRIhMUEGE1FhByJxFDKB
ZWZnaGlqc3R1dnd4eXqDhIWGh4iJipKTlJWWl5iZmqKjpKWmp6ipqrKztLW2t7i5usLD
x8jJytLT1NXW19jZ2uHi4+Tl5ufo6erx8vP09fb3+Pn6EQACAQIEBAMEBwUEBAABAncA
AQIDEQQFITEGEkFRB2FxEyIygQgUQpGhscEJIzNS8BVictEKFiQ04SXxFxgZGiYnKCkq
zHWv2g/EGtF49OSSNCOq9qFNy+FByJP3nY//2Q==
```

520 { ... }

```
CHK 3 2090 LAST
Content-ID: <904.48xxx@foo.com>
Content-Location: http://foo.com/images/image3.jpeg    ←532  }531
Content-Type: image/jpeg
Content-Transfer-encoding: base64
Content-Disposition: attachment /9j/xAGiAAABBQEBAQEBAQAAAAAAAAAAAQIDBAUGBwgJCgsBAAMBAQEBAQEBAQEAAAAA
AAABAgMEBQYHCAkKCxAAAgEDAwIEAwUFBAQAAAF9AQIDAAQRBRIhMUEGE1FhByJxFDKB
ZWZnaGlqc3R1dnd4eXqDhIWGh4iJipKTlJWWl5iZmqKjpKWmp6ipqrKztLW2t7i5usLD
x8jJytLT1NXW19jZ2uHi4+Tl5ufo6erx8vP09fb3+Pn6EQACAQIEBAMEBwUEBAABAncA
AQIDEQQFITEGEkFRB2FxEyIygQgUQpGhscEJIzNS8BVictEKIiQ04SXxFxgZGiYnKCkq
zHWv2g/EGtF49OSSNCOq9qFNy+FByJP3nY//2Q==
```

530 { ... }

```
CHK 1 23 LAST
  </body>
</html>

CHK 0 0 LAST
```

| | 701 | 702 | 703 | 704 | 705 | 706 | 707 |
|---|---|---|---|---|---|---|---|
| 700 | MANAGE-MENT NUMBER | ELEMENT TYPE | RENDER-ING SIZE | REFERENCE DESTINA-TION | ACQUISITION STATE | DATA SOURCE TYPE | STORAGE LOCATION |
| | 1 | TEXT | 300*35 | NONE | COMPLETED | NONE | 0x1000 |
| | 2 | IMAGE | 1*1 | http://aaa...... | UNCOMPLETED | UNKNOWN | |
| | 3 | TEXT | 200*20 | NONE | COMPLETED | NONE | 0x1100 |
| | 4 | IMAGE | 500*500 | http://bbb...... | COMPLETED | OUTSIDE | 0x1300 |
| | 5 | IMAGE | 1*1 | cid:100...... | UNCOMPLETED | INTERNAL | |
| | 6 | TEXT | 250*20 | NONE | COMPLETED | NONE | 0x1500 |
| | 7 | TABLE | 500*600 | NONE | COMPLETED | NONE | 0x1600 |
| | 8 | IMAGE | 300*150 | cid:105...... | COMPLETED | INTERNAL | /abc/def.jpg |
| | ⋮ | ⋮ | ⋮ | ⋮ | ⋮ | ⋮ | ⋮ |

Fig. 7

| 800 | 801 | 802 | 803 |
|---|---|---|---|
| | PAGE NUMBER | OUTPUT STATE | POINTER |
| | 1 | NOT PRINTED | ● |
| | 2 | NOT PRINTED | ● |
| | 3 | NOT PRINTED | ● |
| | ⋮ | ⋮ | ⋮ |

810-1:

| 811 | 812 | 813 |
|---|---|---|
| MANAGE-MENT NUMBER | RENDER-ING POSITION | ACQUISITION STATE |
| 1 | (0,0) | COMPLETED |
| 2 | (0,40) | UNCOMPLETED |
| 3 | (0,45) | COMPLETED |
| 4 | (0,70) | COMPLETED |

810-2:

| MANAGE-MENT NUMBER | RENDER-ING POSITION | ACQUISITION STATE |
|---|---|---|
| 5 | (0,0) | UNCOMPLETED |
| 6 | (0,5) | COMPLETED |
| 7 | (0,30) | COMPLETED |

Fig. 8

EXAMPLE TENTATIVE LAYOUT BEFORE ACQUISITION OF REFERENCE DATA

FIRST PAGE

EXAMPLE LAYOUT AFTER ACQUISITION OF REFERENCE DATA

Fig. 13

IMAGE FORMING DEVICE AND IMAGE FORMATION CONTROL METHOD

BACKGROUND OF THE INVENTION

1. Field of the Invention

The present invention relates to an image forming device for analyzing a document to form an image of the document, which is written in a description language, such as Hyper Text Markup Language, or HTML, which allows acquisition of display content data of a document element from a place other than where the document element is described.

2. Description of the Related Art

Recent development of the World Wide Web, or WWW, has led to the rapid increase in the use of documents written in a markup language, such as HTML or XML (extensible Markup Language). For conventional printing of these documents, generally, a browser and a printer driver in a personal computer perform layout and page dividing for creation of a page image, which is then provided to a printer for printing.

In recent years, common use of personal data assistants, or PDAs, data transmitting mobile telephones, and so forth, has created an increased demand to send such an HTML document from a PDA or the like to a printer for printing. However, a PDA or the like is not adapted to holding a highly sophisticated printer driver or the like and may often suffer from a strict limitation of memory capacity.

In order to address these problems, there is proposed a print service in which an HTML document or the like is sent directly to a printer for printing (referred to as direct print) or a PDA or the like sends a uniform resource locater, or a URL, to a printer so that the printer can download the document identified by the URL for printing (referred to as pull-print).

Nowadays, XHTML-print is established as a standard specification for some standards, such as bluetooth and Universal Plug and Play, or UpnP, and is regarded as one of the essential languages for printers.

In order to print a document written in these languages, such as HTML and XHTML-print, since these languages do not have the concept of pages, a rendering size and layout of each document element must be determined before page dividing is applied to the document to fix page breaks.

Here, an XHTML-print document or the like may often include an element, such as an image, which refers to an outside file or a code within the document but in a different place (the latter referred to as an inline image). Because the rendering size of such an element is yet to be known at the time when the element is found based on a tag during analysis of the document, the element cannot be laid out until acquisition of its substantial data from a reference destination (the substantial data hereinafter referred to as display content data).

With the above as background, a conventional printer for printing a document written in XHTML-print or the like first analyzes the document and acquires display content data of all document elements found in the analysis and then rasterizes (rendering) for printing (see Japanese Patent Laid-open Publication No. Hei 10-074265).

However, this conventional printing in which printing is withheld until display content data of all document elements is acquired has a problem of delayed start of printing because data downloading from an outside reference destination may take time. Another problem of the conventional printing is the need for a large capacity work memory to hold display content data of all document elements, which increases cost.

SUMMARY OF THE INVENTION

The present invention advantageously makes it possible for an image forming device for forming an output image of a document while incorporating display content data of a document element retrieved from outside the document or from a different place within the document to start printing earlier than in conventional printing. The present invention also makes it possible for such a device to process a relatively large document using a small work memory.

According to the present invention, there is provided an image forming device for analyzing a document which contains a plurality of document elements, acquiring display content data of each document element found in the analysis, and laying out the display content data of each document element acquired and loaded to a work memory according to a result of the analysis to thereby create an image of each page for image formation on a predetermined medium. In this image formation, a monitor means monitors a state of acquisition of the display content data of each document element. Every time completion of acquisition of the display content data of each document element to be laid out on a first un-output page is detected based on a result of monitoring by the monitor means, application of image formation for that page is instructed by an output control means.

In this output control, every time acquisition of display content data for a first un-output page is completed, image formation for that page is applied.

In an embodiment of the present invention, this image forming device may further comprise memory freeing means for, every time image formation for a page is applied in response to an instruction from the output control means, deleting from the work memory display content data which is unnecessary for a subsequent page among display content data used in the page.

DESCRIPTION OF THE PREFERRED EMBODIMENTS

In the following, an embodiment of the present invention will be described with reference to the accompanied drawings.

Figure 1:
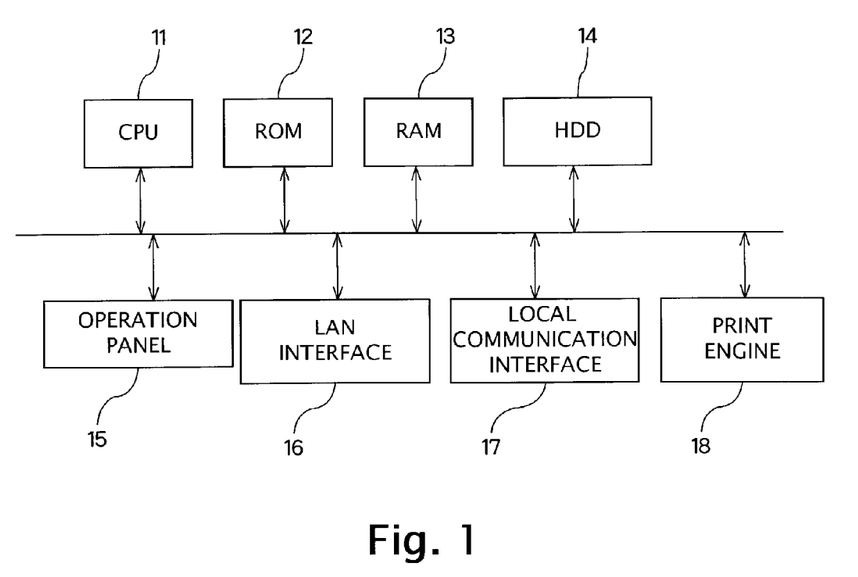
FIG. 1 is a block diagram showing an example of a hardware structure of a printer incorporating the present invention.

FIG. 1 schematically shows an example of a hardware structure of a printer which incorporates the present invention.

This printer comprises a central processing unit, or CPU, 11, a read-only-memory, or ROM, 12, a random-access-memory, or RAM, 13, a hard disk, or HDD, 14, an operation panel 15, a local area network, or LAN, interface 16, a local communication interface 17, and a print engine 18.

The CPU 11 executes various kinds of control programs stored in the ROM 12 to thereby control respective sections of the printer of the present invention so that the printer can perform various operations. The control programs include a program which describes a control operation for dividing a document written in HTML, XHTML-print, or the like into pages for page printing. The page dividing will be described later in detail.

The RAM 13 serves as a working memory region, or a work memory, where the CPU 11 executes various kinds of program and may store received data (such as image data and HTML data) and developed data thereof, or bit map data. The hard disk 14 stores various control setting data set by a user or a service engineer and downloaded data for printing. The operation panel 15 serves as a user interface via which to set a print condition to the printer and may comprise, for example, a touch panel liquid crystal display or various other input buttons.

The LAN interface 16 is responsible for communication with other devices over the LAN or those on the Internet via the LAN. The local communication interface 17 is a communication interface device for communication via radio or wired with a host device according to a communication standard such as Bluetooth or UpnP. The print engine 18 receives printing bit map data in response to a command from the CPU 11 and prints it on a medium such as a sheet of paper.

Figure 2:
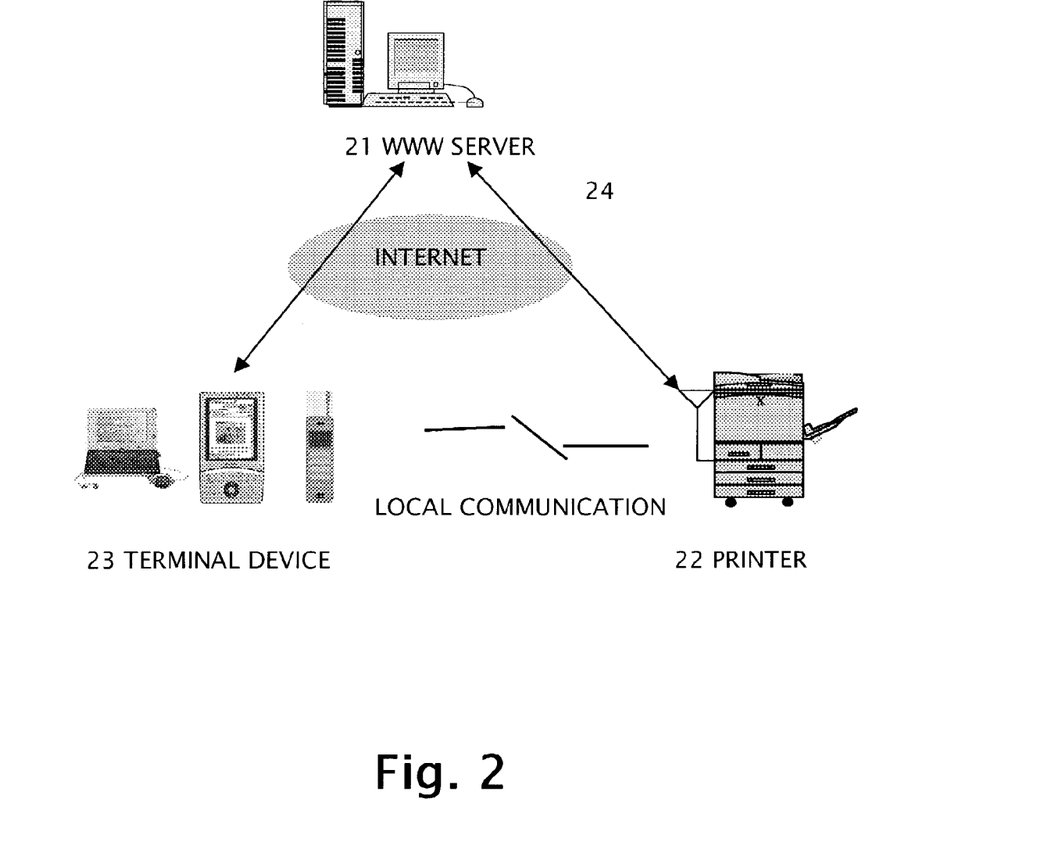
FIG. 2 is a diagram showing an example of a network environment in which the present invention is applied.

FIG. 2 shows an example structure of a system which employs the printer 22. In this example, a terminal device 23, such as a mobile PC, a PDA, or a mobile telephone, sends a printing document, such as an HTML document, downloaded from a WWW server 21 via the Internet 24 to the printer 22 by means of Bluetooth communication or the like and the printer 22, having received the print request, analyzes the document data to create bit map data and prints the data on a medium. In the case where the HTML document contains a document element, such as an image, described in the form of a URL or the like identifying its reference destination, the printer 22 downloads substantial data (display content data) of the document element from a WWW server 21 in possession of the data according to the URL or the like to complete the creation of bit map data.

Alternatively, the URL of a printing document may be directly input using the operation panel 15 of the printer 22, or provided from the terminal device 23 to the printer 22, to thereby instruct the printer 22 to print (pull-print). In these cases, the printer 22 downloads the printing document from the Internet 24 according to the input URL to complete printing.

Figure 3:
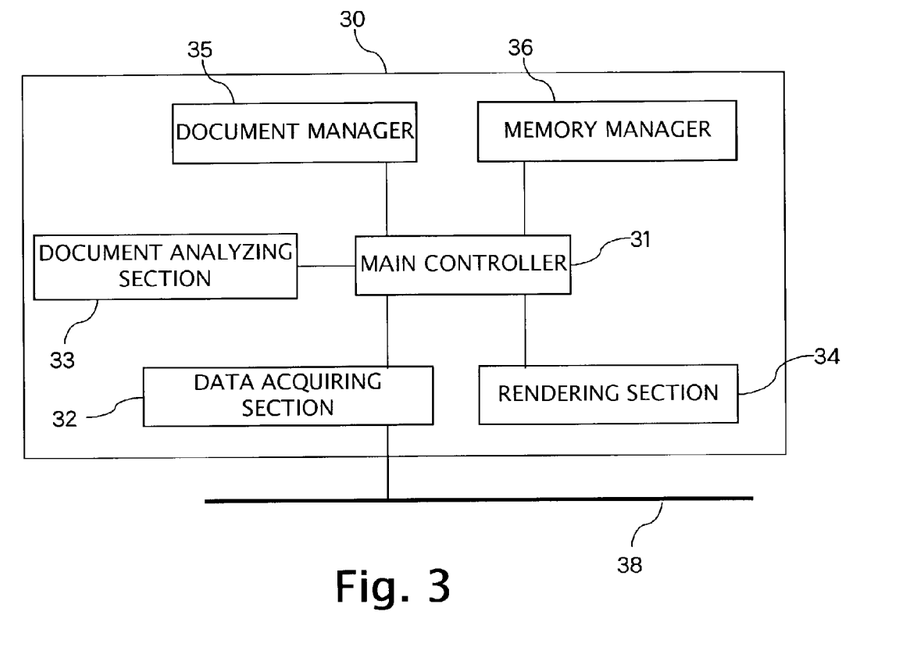
FIG. 3 is a functional block diagram schematically showing a structure of a document processing mechanism of the printer in this embodiment.

FIG. 3 shows a processing mechanism 30 in the printer 22 of the present invention, for printing a document written in a markup language, such as HTML. The processing mechanism 30 of FIG. 3 is achieved by the CPU 11 by executing a program stored in the ROM 12 or the HDD 14.

A main controller 31 is responsible for controlling overall processing by the processing mechanism 30. A data acquiring section 32 receives data via a network, such as a LAN 38 or the Internet, in response to a data acquisition-demand. A document analyzing section 33 analyzes a description of an input document to find document elements therein and determines a logical structure constituted by the found document elements. A document manager 35 controls printing of the document based on the found document elements and their logical structure.

Here, it should be noted that there are two types of document element. A document element of one type, such as a text or a table, whose data content (hereinafter referred to as display content data because data of the content is shown, or displayed, as a result of printing) is contained in its description in the printing document and a document element of another type, such as an image, which refers to data in a different place as its display content data. A description of a document element of the latter type contains reference information indicative of a location or identification of display content data of the element.

A document element of the latter type can be further divided into two type. One type in which the display content data is present outside the printing document, such as in a server over the Internet, and another type in which the display content data is present within the same printing document but in a different place. Generally, an outside reference destination may be identified by a URL, while a reference destination within the same document may be identified by "cid:" (content ID), or link information often used in an XHTML-print document to refer to attached data, for example. However, this is not always the case as a URL may sometimes indicate a reference destination within the same printing document.

When a document element described in the form of reference to display content data in a different place is found by means of tag detection, the document analyzing section 33 requests the data acquiring section 32 to acquire the display content data.

Those various data, including HTML document data, display content data of each document element found in an analysis of an HTML document from its beginning, a data or page management table created and updated in progress of the analysis, and the like, are all stored in the RAM 13 or the HDD 14.

Based on the display content data of each document element stored in the RAM 13, the rendering section 34 creates a page image, beginning with the first page, in a page buffer, not shown, which is provided separately from the RAM 13. The thus created page image is sent to the print engine 18 for printing on a sheet of paper, for example.

The memory manager 36 controls the RAM 13 during the processing by the above-described sections. Specifically, the memory manager 36 allocates free space in the RAM 13 to each of the memory securement requests from the document analyzing section 33, the data acquiring section 32, and the rendering section 34, and frees a memory region where stored data is no longer necessary.

Figure 4:
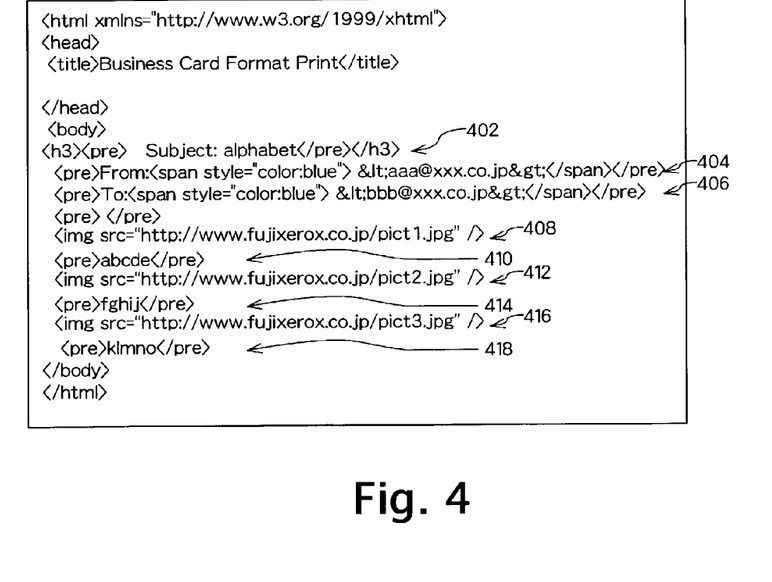
FIG. 4 is a diagram showing an example of a printing document which refers to image data outside the document.
Figure 5:
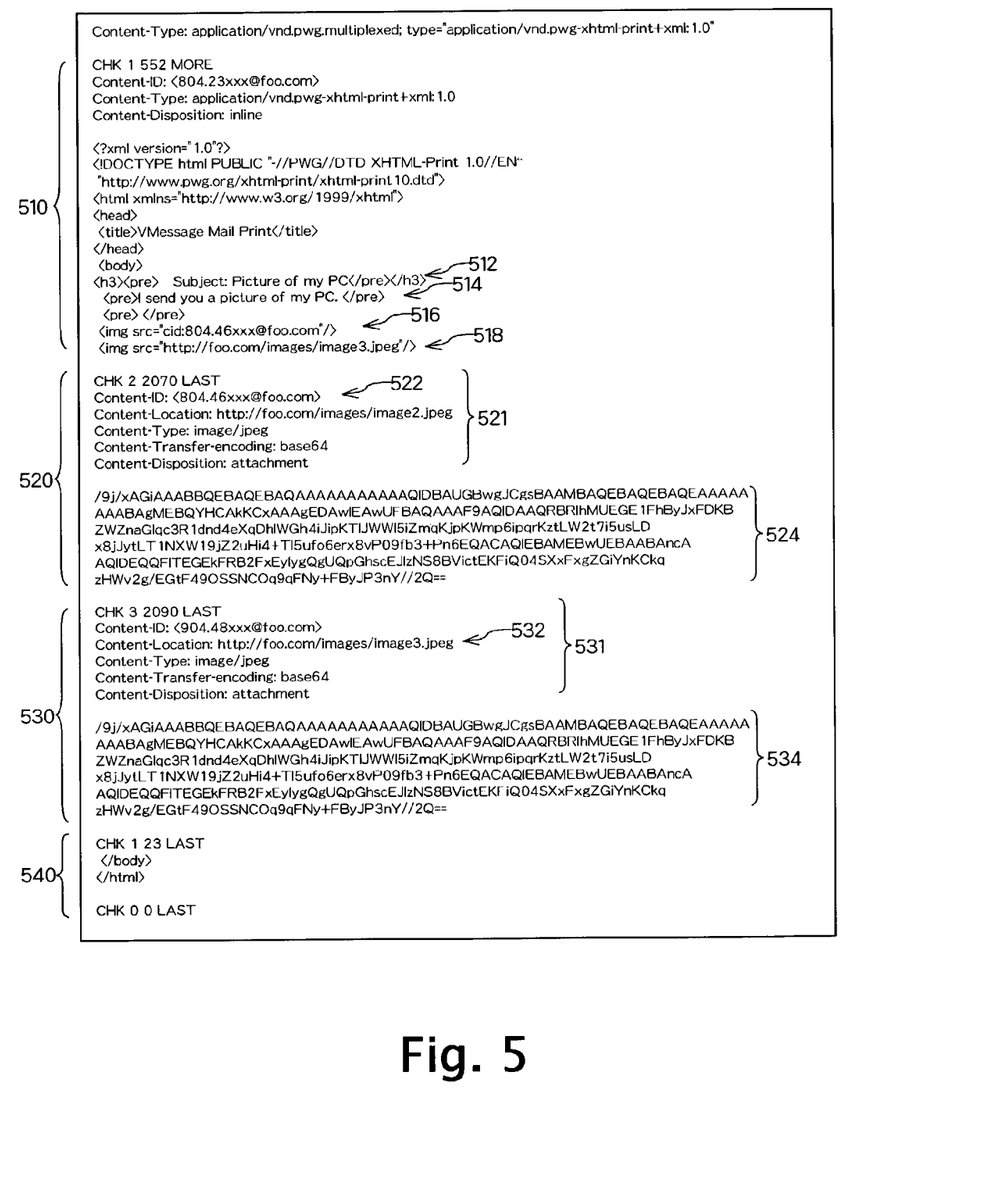
FIG. 5 is a diagram showing an example of a printing document which refers to image data within the document.

With reference to FIGS. 4 and 5, an example description of a printing document will be described.

FIG. 4 shows an example HTML document in which, following the text document elements 402, 404, 406, image document elements 408, 412, 416 and text document elements 410, 414, 418 are alternately described. In this example, content of a text document element is described between the start and end tags for the element and display content of an image document element is described in the form of reference to a URL. Because all of the data identified by URLs in this example are present outside the HTML document, the respective image data must be downloaded according to the URLs before printing.

FIG. 5 shows an example XHTML-print document in which image data are all incorporated therein in a multipart format. This document consists of four parts 510, 520, 530, 540 and an HTML description which defines the entire structure of the document is divided so as to be respectively included in the first and fourth parts 510, 540. The HTML description contains two text elements 512, 514 and two image elements 516, 518 arranged in this order.

The image element 516 describes its reference destination of its display content, i.e., image data, in the form of content ID (cid:) and image data corresponding to this content ID is contained in the second part 520. That is, because the content ID in the description of the image element 516 coincides with the content ID 522 in the part header 521 of the second part 520, it is known that the code data in the body 524 of the second part 520 is the image data, or display content, of the image element 516.

Likewise, although the image element 518 describes the reference destination of its display content, i.e., image data, in the form of a URL, because the URL coincides with Content-Location 532 in the part header 531 of the third part 530, it is known that the code data in the body 534 of the third part 530 is the image data, or display content, of the image element 518.

As described above, a document element in the example of FIG. 5 refers to, for its display content, data within the same printing document but in a different part.

When such a printing document is supplied to the printer in this embodiment, the document analyzing section 33 begins analyzing its descriptions from the beginning and, when any document element is found, the data acquiring section 32 acquires display content data of the found document element. The document manager 35 proceeds with printing according to the result of the analysis and the acquired display content data.

In the following, processing by the respective sections will be described.

Figure 6:
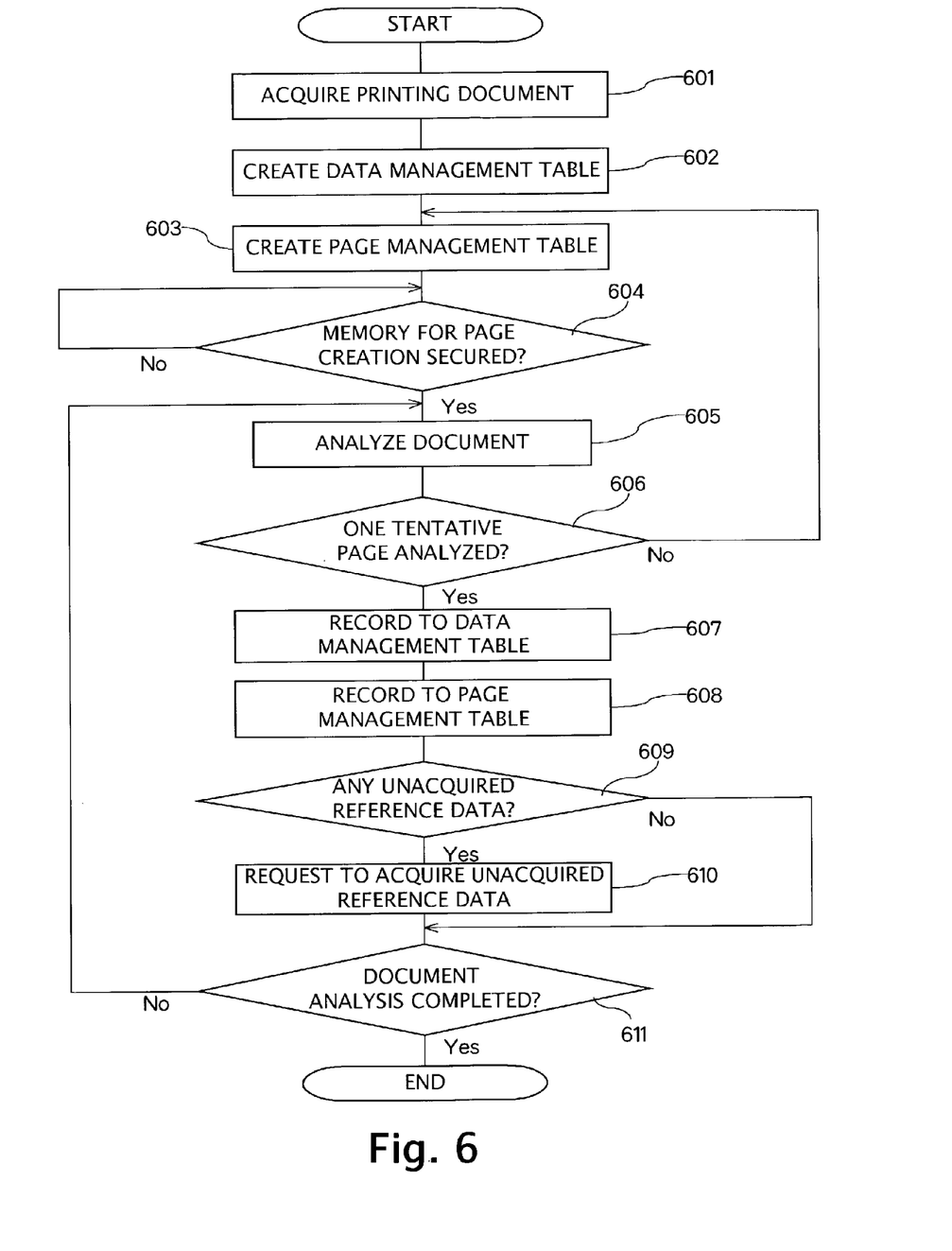
FIG. 6 is a flowchart of an example of a document analysis procedure.

FIG. 6 is a flowchart of processing by the document analyzing section 33. Upon receipt of a printing document (601), the document analyzing section 33 instructs the document manager 35 to create a data management table for the document (602).

Figure 7:
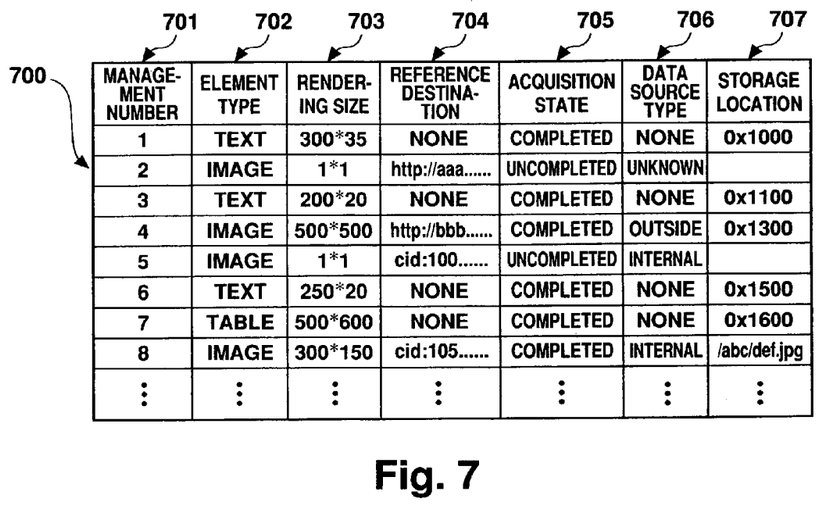
FIG. 7 is a diagram showing an example of data content of a data management table.

A data management table is a table for use in management of each document element contained in a document, an example of which is shown in FIG. 7.

The data management table 700 in FIG. 7 shows, for every document element, a management number 701, an element type 702, a rendering size 703, a reference destination 704, an acquisition state 705, a data source type 706, and a storage location 707.

The management number 701 is a unique identification number imparted to each document element. The element type 702 indicates a type of the document element, including a text, a table, an image, and so forth. The rendering size 703 indicates a rendering size of display content data of the document element, specifically, its vertical and horizontal lengths in units of pixels or mm.

The reference destination 704 indicates a data source, or a reference destination, holding display content data of the document element in the form of a URL or content ID, for example. The reference destination 704 shows "none" for a text element having display content data which is contained in the description of the document element itself.

The acquisition state 705 indicates whether or not display content data of the document element has been acquired, in which data acquired, or data acquisition complete, and data unacquired, or data acquisition incomplete, are indicated by "completed" and "uncompleted", respectively. For a document element in need of acquiring its display content data from a reference destination, its acquisition state 705 remains "uncompleted" until the acquisition is completed. For a document element having content data which is contained in its description, its acquisition state 705 is changed to "completed" upon detection of the document element.

It should be noted that the process of acquiring data from an outside source could be in the state of failure or timeout, in addition to incompletion or completion in the sense that the acquisition is successfully finished. Considered as modification of the state of completion in the sense that an attempt of acquisition is completed regardless of the result, failed acquisition and timeout may also be expressed as "completed" in the acquisition state 705. Alternatively, these states may be discriminated so that completion in the sense that acquisition is successfully finished, failure, timeout, and incompletion in the sense that an attempt at acquisition is not applied or finished yet may all be distinctly expressed.

The data source type 706 indicates if display content data of a document element is acquired from outside or within the printing document. Specifically, a reference destination 704 described in the form of content data ID beginning with cid: indicates acquisition from within the printing document, while that which is described in the form of a URL often indicates acquisition from outside the printing document. However, as a URL sometimes refers to display content data within the same document, as in the example of FIG. 5, the data source type 706 relevant to a reference destination described in the form of a URL may initially be set as "unknown" and later changed to "in" when corresponding display content data is found or to "out" when no such data is found in the document during the analysis. It should be noted that, for a text element or the like having display content data which is contained in the description of the document element itself, the data source type 706 should indicate "none".

The storage location 707 indicates a place where the acquired display content data is held. For display content data held in the RAM 13, a start address of the RAM 13 is recorded and, for display content data stored in the HDD 14, the name of a file storing the data is recorded.

Returning to FIG. 6, at step 602, an empty data management table corresponding to the printing document is created so that information is recorded therein as progress of the document analysis.

After the creation of an empty data management table (602), the document analyzing section 33 instructs the document manager 35 to create a page management table (603). A page management table is a table showing management information on each page resulting from page dividing for printing a document without the concept of pages. An example of the page management table is shown in FIG. 8.

Figure 8:
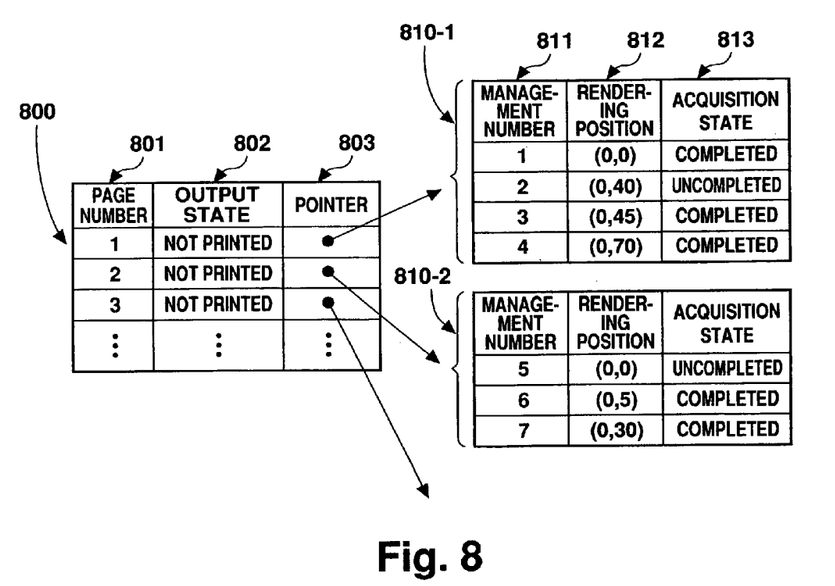
FIG. 8 is a diagram showing an example of page content of a page management table.

The page management table of FIG. 8 consists of an entire table 800 and individual page tables 810-1, 810-2, and so on, each individual page table 810 showing information on each page. The entire table 800 shows, for every page, a page number 801, an output state 802 indicating whether or not the page has been printed, and a pointer 803 to an individual page table 810 of the page.

The individual page table 810 shows, for every document element contained in the relevant page, a management number 811, a rendering position 812, and an acquisition state 813. The management number 811 is a management number imparted to each document element, corresponding to a management number 701 in the data management table 700. The rendering position 812 indicates a reference point, for example, the upper left corner of a rectangular region, expressed in units of pixels, mm, or the like for use in laying out the document element on the page. The acquisition state 813 indicates whether or not display content data of the document element has been acquired, corresponding to the acquisition state 705 of the data management table 700.

Referring to FIG. 6, at step 603, an empty table 800 for a printing document is created so that information on each page is recorded therein as progress of the document analysis.

After the creation of an empty page data management table (603), a memory region necessary for page creation in the RAM 13 is secured (604) before beginning analysis of the printing document (605). The analysis can be made using a known analysis method according to a conventional standard such as HTML or XHTML-print. While sequentially finding document elements constituting the printing document, the document analyzing section 33 lays out the found document elements on a page according to a document structure defined by a tag or the like and print style conditions, including page and font sizes.

In the above, for a document element, such as a text element, having the display content data contained in a description between begin and end tags for the document element, its rendering size can be known at the time when the document element is found, based on its display content data and print condition. Therefore, for layout, a region of the size equal to the rendering size may be used. For a document element which refers to display content data in a different place, on the other hand, its rendering size is often unknown at the time when the document element is found since its display content data is yet to be acquired. Therefore, dummy data having predetermined shape and size is used for layout.

The document analysis is continued as described above, while laying out the respective document elements found during the analysis from the beginning of the first page, until it comes to a document element to be laid out extending beyond the end of the page (606).

It should be noted that, when a rendering size is described in the description of an element which refers to, for its document element, data in a different place, the described rendering size is used for tentative laying out.

When a document element extending beyond the page end is found during the analysis, page dividing is applied according to a predetermined page dividing rule, for example, by forwarding the element to the next page or dividing into pages at a point before the element. This page dividing is only tentative because there may be some document elements whose content data is yet to be acquired at this stage and could affect the page dividing when acquired.

It should be noted that a printing document which is subjected to page break setting according to, for example, Cascading Style Sheets, or CSS, must be divided into pages additionally at the designated CSS page breaks.

The document analyzing section 33 records information on the thus tentatively determined pages in the data and respective page management tables in the document manager 35 (607, 608). Specifically, a unique management number is imparted to each document element found in the analysis and information concerning the items listed in the data management table 700, such as a rendering size, a reference destination, an acquisition state, and a data source type, are recorded in the data management table 700. In addition, an individual page table 810 is created for each page so that information, such as a rendering position, on each document element laid out on the page is recorded therein.

Returning to FIG. 6, it is determined whether there is any element without acquisition of its display content data left on a page tentatively determined at step 606 (609). If there is any (Yes at step 609), the document analyzing section 33 requests the data acquiring section 32 to acquire the unacquired display content data (610). Then, it is determined whether or not the printing document has been analyzed throughout (611). If it has not yet been analyzed throughout, (No at step 611), the operation returns to step 605 to continue the analysis.

Through the above-described processing, a printing document is entirely analyzed and document elements in the documents are tentatively laid out for tentative page dividing.

In the example management tables of FIGS. 7 and 8, since display content data of the image element having a management number "2" has yet to be acquired, dummy data size, namely 1*1, is tentatively set for the element (see FIG. 7) and its rendering position is calculated based on the tentative rendering size (see FIG. 8).

Figure 9:
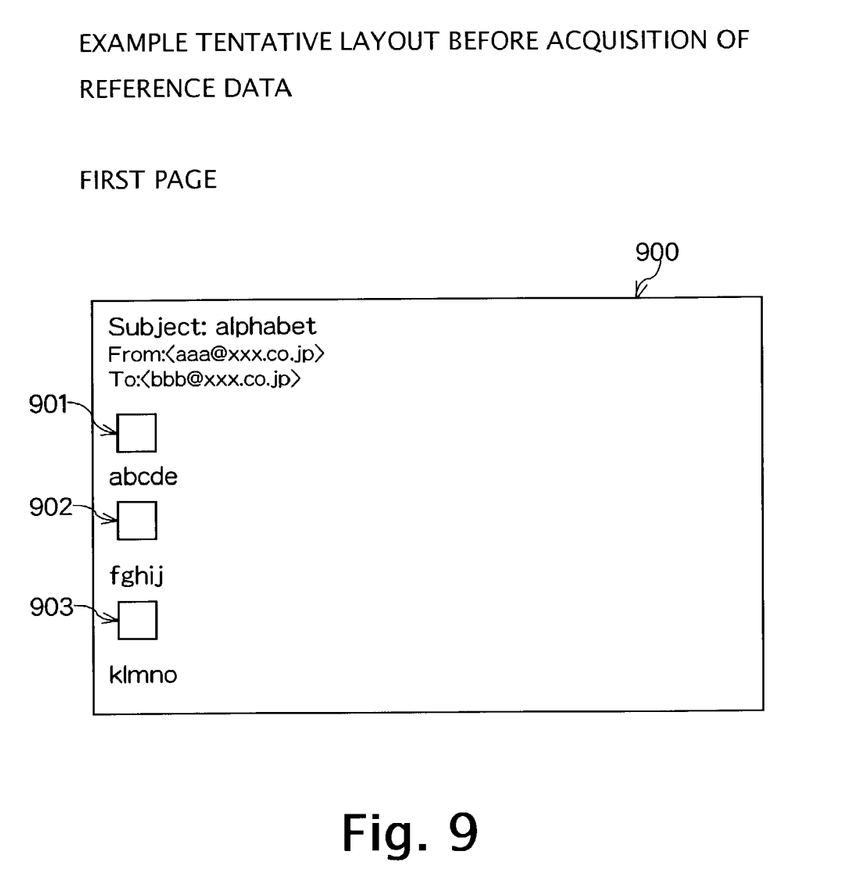
FIG. 9 is a diagram showing an example of a tentative page layout before acquisition of data from a reference destination.

FIG. 9 shows an example page 900 resulting from tentative laying out of the printing document of FIG. 4 according to the analysis procedure described above. In this example, the respective elements, namely image elements 408, 412, 416, each of which are described between texts, are laid out using dummy images 901, 902, 903, respectively, each having predetermined size and shape.

Figure 10:
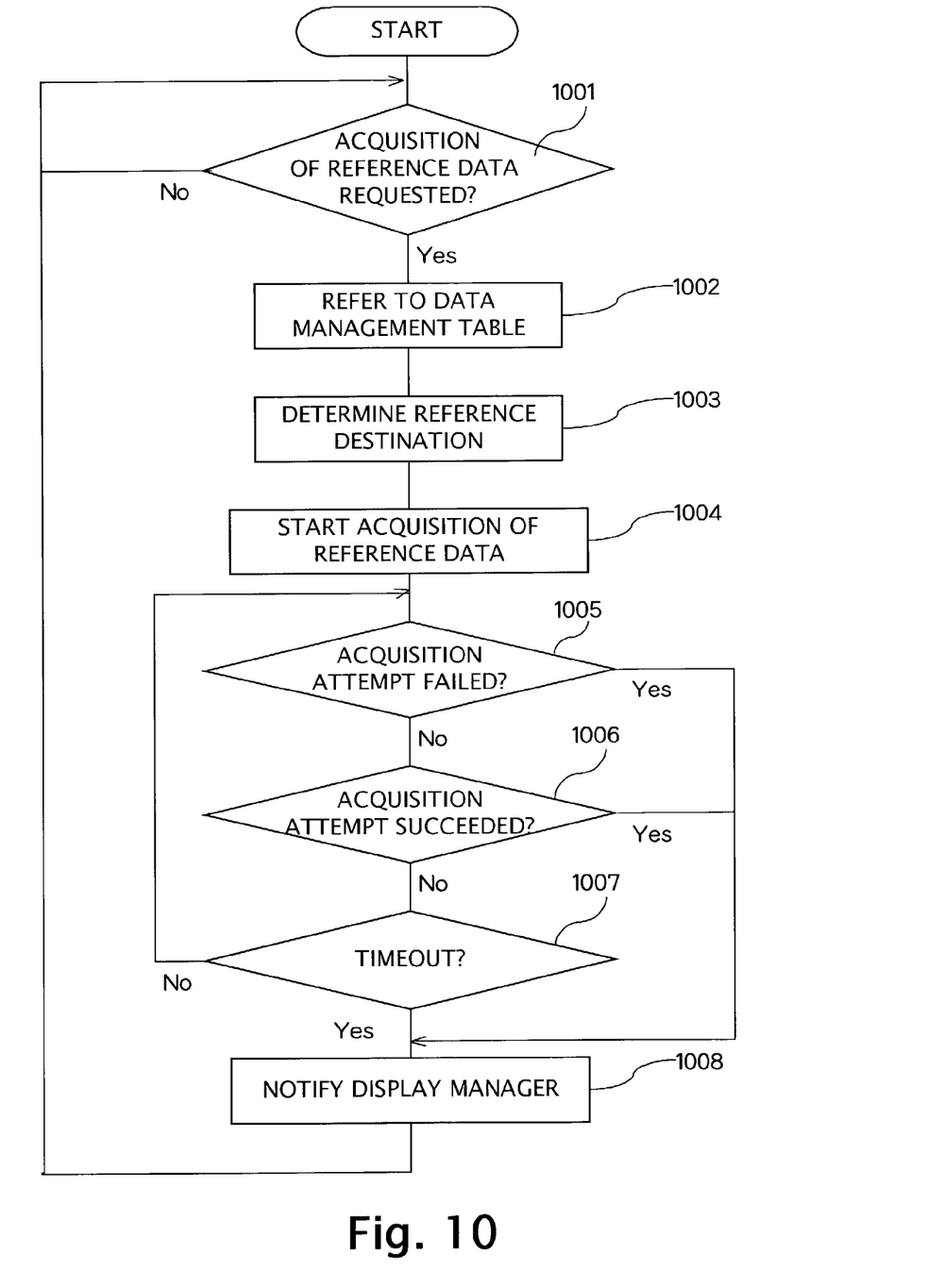
FIG. 10 is a flowchart of an example of a data acquisition procedure executed by a data acquiring section.

Processing in the data acquiring section 32 will now be described with reference to FIG. 10.

The data acquiring section 32 waits for the arrival of a reference data acquisition request from the document analyzing section 33 (1001). Upon receipt of the request, the data acquiring section 32 refers to the data management table 700 (1002) to determine a reference destination for the requested data (1003) and begins data acquisition from the determined reference destination (1004).

In the determination, for a reference destination described in the form of content ID, or cid:, the data acquiring section 32 waits until the document analyzing section 33 finds a part having the same content ID in the printing document and, when it is found, determines data in the body of the found part to be the targeted display content data. For a reference destination described in the form of a URL, on the other hand, the data acquiring section 32 downloads data identified by the URL from a server in the Internet and, moreover, monitors whether or not the document analyzing section 33 finds a part having the same URL as its Content Location in the printing document. Should display content data identified by the URL be found in the printing document after downloading of the display content data according to the URL, the data found in the document is used while abandoning the downloaded data so that the RAM capacity can be saved.

The data acquiring section 32 continues processing for data acquisition until either the processing fails due to a problem with a server in possession of the data (1005), the processing is successfully completed (1006), or a predetermined limit time has elapsed after the beginning of the processing (1007) and, when any of these events happens, ceases the processing and notifies the document manager 35 of the result (1008). For successful acquisition, a location where the acquired display content data is held, such as an address in the RAM 13, a path to a storage file in the HDD 14, is also notified.

As described above, the data acquiring section 32 issues an acquisition attempt completion notice to the document manager 35 every time processing for acquisition is completed, regardless of success or failure, before getting itself ready to receive a next data acquisition request.

Figure 11:
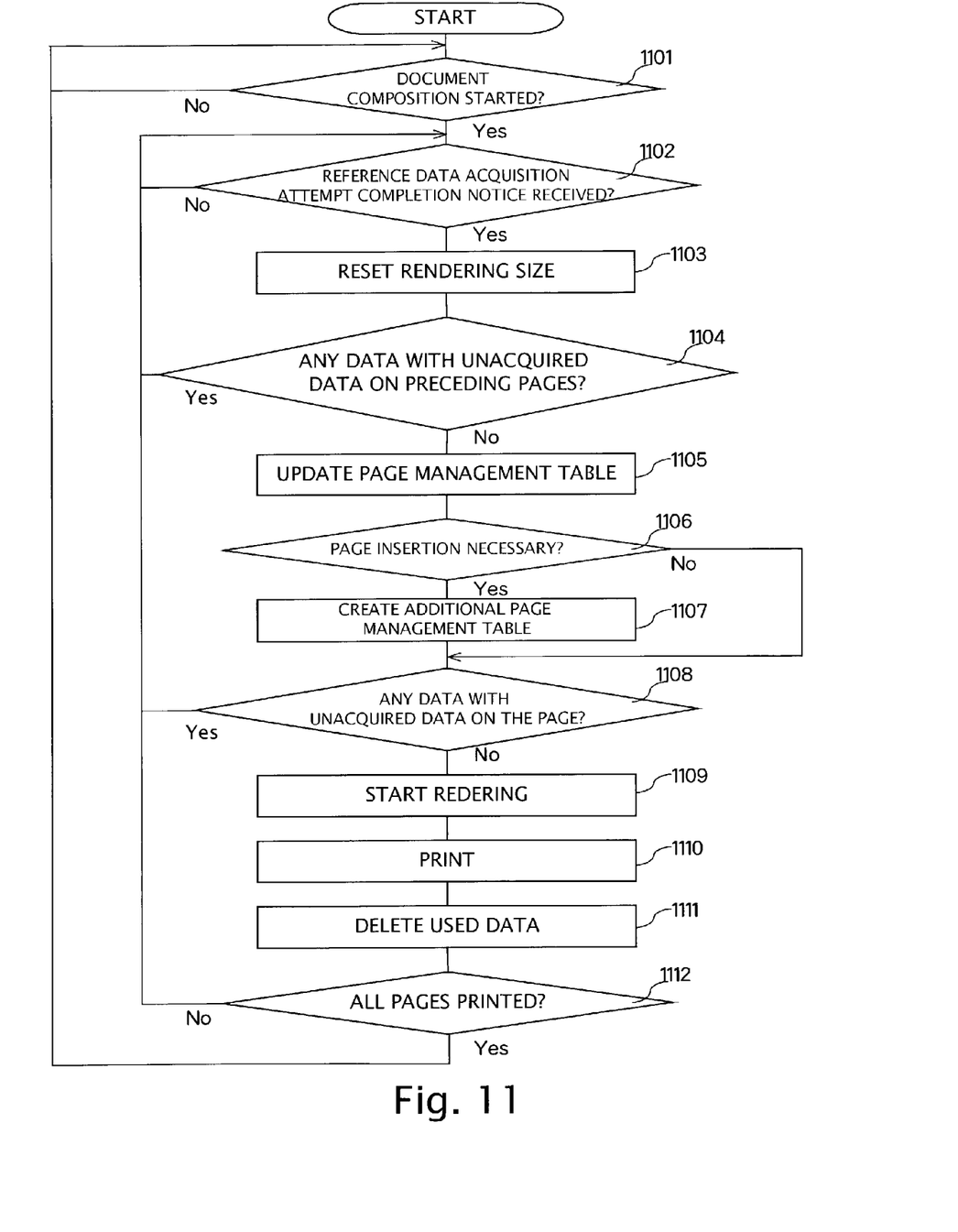
FIG. 11 is a flowchart of an example of a page output control procedure executed by a document manager.

With reference to FIG. 11, output control by the document manager 35 will be described.

The document manager 35 waits for arrival of a document composition start command (1101). The command can be issued when, for example, tentative page layout has been completed with respect to a predetermined number of pages based on the analysis by the document analyzing section 33. That is, in this embodiment, document analysis and document output by the document manager 35 are performed substantially in parallel.

After receipt of the document composition start command, the document manager 35 waits for arrival of an acquisition attempt completion notice from the data acquiring section 32 (1102). Upon receipt of the notice, the document manager 35 resets a rendering size of the document element corresponding to the notice (1103).

For example, when the document manger 35 receives a notice of failed acquisition or timeout, the document manager 35 changes the relevant rendering size in the data management table 700 into a rendering size of a predetermined failed acquisition mark. When the document manger 35 receives a notice of successful acquisition, on the other hand, the document manager 35 detects a rendering size of the acquired display content data, which is now held in storage, and changes the relevant rendering size in the data management table 700 into the detected rendering size.

It should be noted that, should display content data be compressed or coded data, expansion or decoding must first be applied before detection of the rendering size.

After resetting the rendering size as described above, the document manager 35 changes "uncompleted" to "completed" for acquisition state 705 in the data and page management tables 700, 800.

Then, the document manager 35 refers to the page management table to specify a page on which that document element is intended to be laid out and determines if there is any document element without acquisition of its display content data left on pages which precede that page (1104). When there is such a page (Yes at step 1104), the operation returns to step 1102 to wait for arrival of an acquisition attempt completion notice from the data acquiring section 32.

When there is no such data (No at step 1104), on the other hand, the document manager 35, referring to the rendering size in the data management table, applies re-layout of the document elements, modifies page dividing based on the result of the re-layout, and updates the page management table accordingly (1105).

Then, it is determined whether or not the re-layout causes a need for insertion of an additional page at a page end or before a page break (1106). Should such a need be caused (Yes at step 1106), a new individual page table 810 is created for the additional page (1107).

Figure 12A:
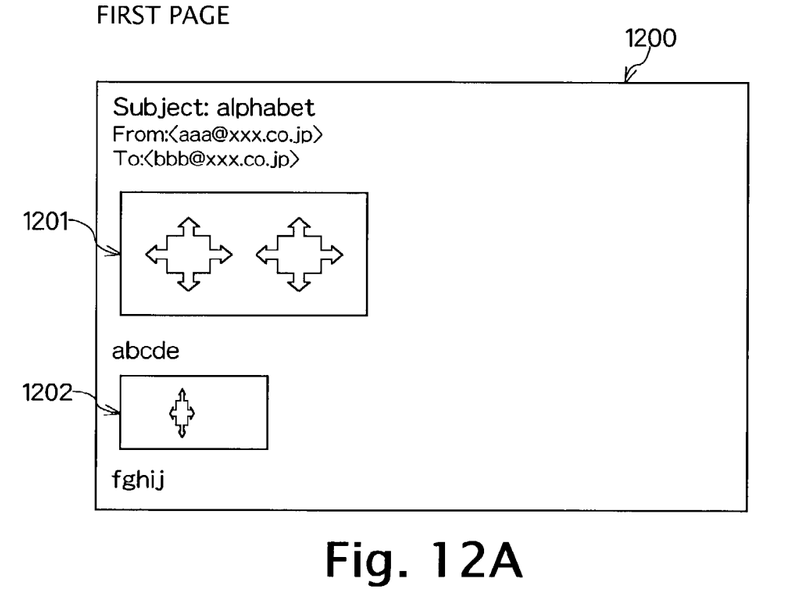
FIG. 12A and FIG. 12B are diagrams showing an example of a page layout after acquisition of data from a reference destination.
Figure 12B:
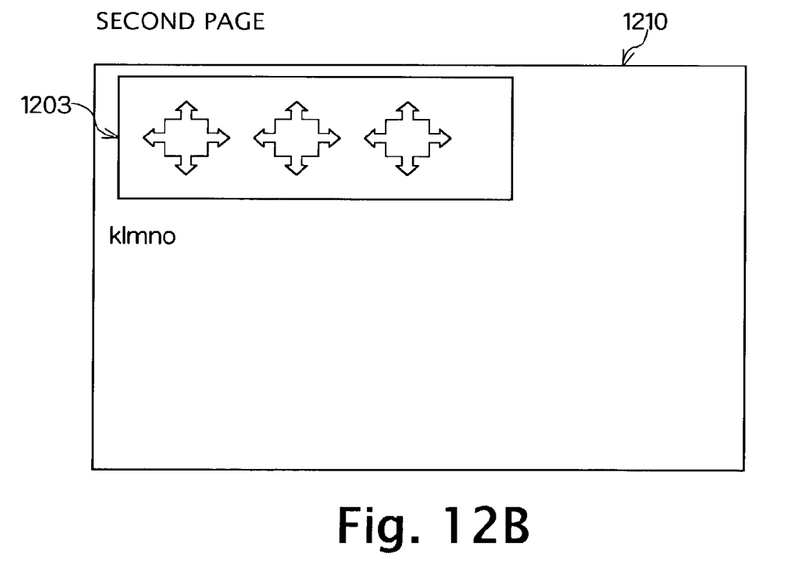

Specifically, in the example of FIG. 9, the single page 900 of FIG. 9 is modified into two pages 1220, 1210 of FIG. 12A and FIG. 12B as a result of re-layout. This is because acquisition of display content data 1201, 1202, 1203, for which a dummy image 901 is used for tentative layout, results in increase of the respective rendering sizes and, as a result of re-layout using the increased rendering sizes, the display content data 1202 and subsequent part are pushed into the next page 1210.

As described above, in this embodiment, the page management table is updated only when display content data for all pages which precede the page for which display content data has been just acquired, is all acquired. This arrangement makes it possible to fix the page layout, beginning with the first page, and to avoid changing of the content of a page having all of its display content data acquired, after it has been fixed.

An alternative arrangement may be such that the page management table is updated, every time display content data is acquired, so as to reflect the rendering size of the acquired data. This arrangement, however, results in excessively frequent updating and thus increases a processing load.

Returning to FIG. 11, after updating the page management table, the document manager 35 checks the individual page table 810 for the page on which it is intended to layout the document element whose display content data is acquired at step 1102, to see if there is any document element without acquisition of its display content data left on the page (1108). When there is any such data (Yes at step 1108), the operation returns to step 1102. When there is no such data, on the other hand (No at step 1108), the document manager 35 instructs the rendering section 34 to begin rendering of an image of that page (1109).

In response to the instruction, the rendering section 34 refers to the individual page table 810 and the data management table 700 to specify display content data of the respective document elements belonging to that page and then renders an image of each document element in a page buffer, not shown, using their display content data and rendering position information.

The print engine 18 reads out the rendered image from the page buffer to print on a medium (1110). After the printing, the memory manager 36 deletes from the RAM 13, display content data which is no longer necessary due to the printing completed (1111). In addition, the document manager 35 changes "not printed" to "printed" for an output state of the page in the entire table 800 upon completion of printing in response to the instruction made at step 1109.

Then, the document manager 35 refers to the page management table to determine if all pages of the printing document have been printed (1112). When they have not yet all been printed (No at step 1112), the operation returns to step 1102 to wait for arrival of a reference data acquisition attempt completion notice. When they have all been printed (Yes at step 1112), on the other hand, the operation returns to step 1101 to wait for arrival of a document composition start instruction for the next printing document.

In the above-described procedure, every time display content data of all document elements to be laid out on a first un-output page of a printing document is acquired, printing is applied to print that page.

Figure 13:
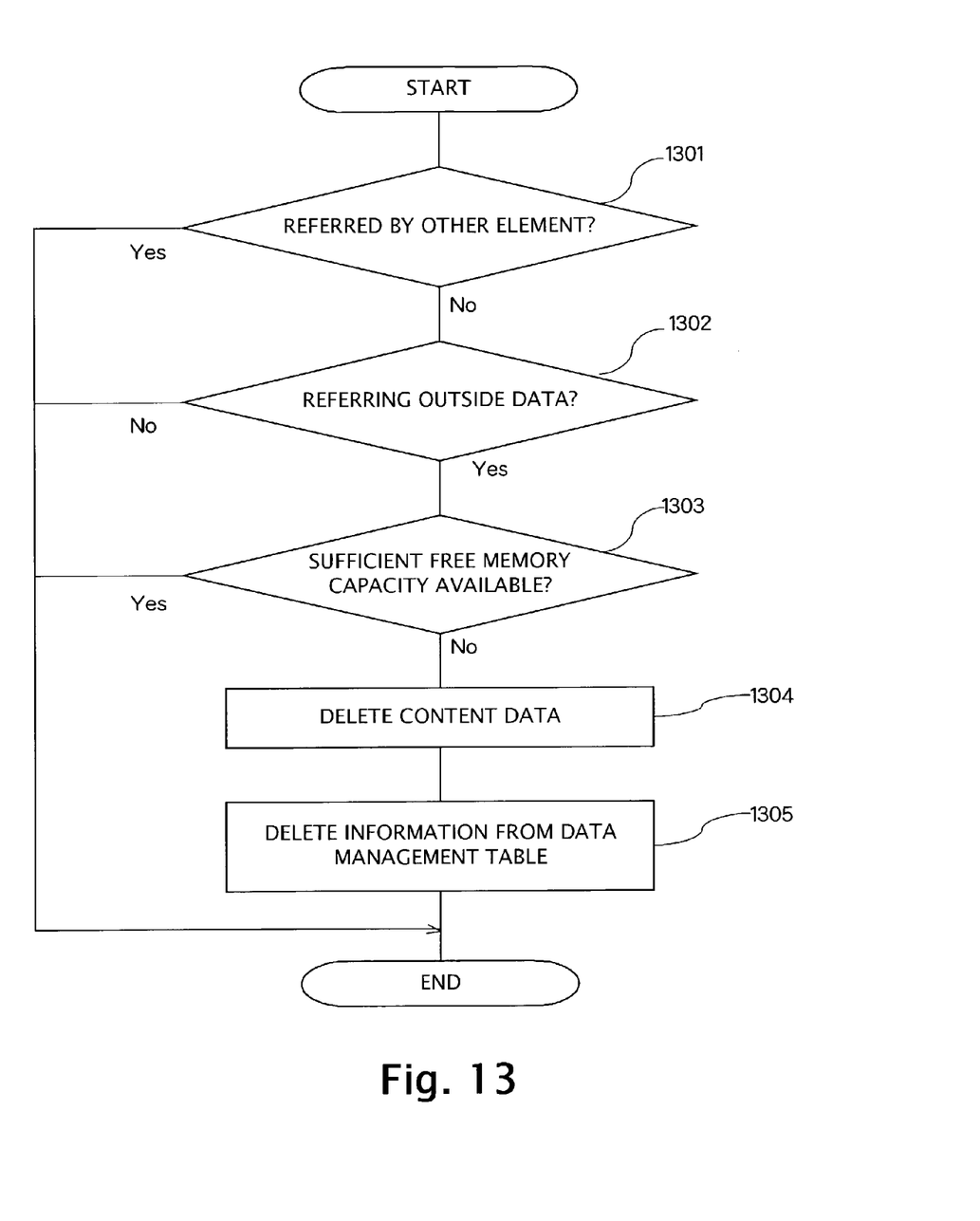
FIG. 13 is a flowchart of an example of a data deletion procedure.

With reference to FIG. 13, data deletion by the memory manager 36 will be described.

When the memory manager 36 receives a page printing completion notice concerning a certain page from the document manager 35, the memory manager 36 executes the processing of FIG. 13 with respect to each document element contained in that page.

Specifically, the memory manager 36 determines if the display content data of the targeted document element is referred to by any other document element in its subsequent pages (1301). This determination is made by finding a reference destination of the document element with reference to the data management table 700 and checking if there is any other document element in the subsequent pages, which refers to the same reference destination. When a document element is referred to (Yes at step 1301), the display content data is not deleted and the deletion processing is then simply terminated.

When it is not (No at step 1301), on the other hand, determination is now made as to if the display content data has been acquired from outside the printing document (1302). This determination is made by referring to the data source type 706 in the data management table 700. That is, "outside" means acquisition from outside the printing document, and any other notations mean there is a possibility of acquisition from within the printing document.

Deletion of display content data incorporated in a document element may possibly cause a problem such that the data cannot be retrieved from anywhere later should become necessary. In order to avoid this problem, for a document element with its data source type 706 being anything but "outside", the display content data is not deleted and deletion processing is then simply terminated. For a document element with its data source type 706 being "outside", on the other hand, the display content data is deleted as the data can be downloaded again later when it becomes necessary and the operation proceeds to step 1303.

After determination of outside acquisition at step 1302, the memory manager 36 determines if there is sufficient free capacity left in the RAM 13 (1303). This determination can be made, for example, by comparing the free capacity left in the RAM 13 and a predetermined threshold. When it is determined positive (Yes at step 1303), the display content data is not deleted and the deletion processing is then simply terminated. When it is determined negative (No at step 1303), on the other hand, the memory manager 36 deletes the display content data in the RAM 13 (1304) and also relevant information in the data management table (1305).

Should memory capacity shortage occur, the memory manager 36 tentatively deletes display content data held in the RAM 13 to ensure larger free capacity of the RAM 13. For the tentative deletion, the memory manager 36 refers to the page management table so as to delete display content data, beginning with one for a later page. The tentatively deleted data can be saved in the HDD 14 or acquired again from its original source. Tentatively deleted display content data must be reloaded back to the RAM 13 at least by the time a relevant page is going to be printed and is preferably reloaded to the RAM 13 in exchange for unnecessary data being deleted from the RAM 13.

As described above, in this embodiment, every time display content data for laying out on a first unprinted page is acquired, printing is applied to print that page. This arrangement allows earlier start of printing than in conventional printing in which printing is withheld until display content data of all document elements contained in the printing document are acquired.

Further, in this embodiment, every time a page has been printed, the memory manager 36 deletes from the RAM 13 display content data and management information relevant to that page. This arrangement resultantly requires a smaller capacity of the RAM 13 than that in conventional printing in which display content data is all held in a storage until the entire document is printed.

Still further, in this embodiment, before deleting display content data used in a printed page, the possibility of the display content data being used later is considered and, when it is considered possible, the data is preserved in the RAM 13. This arrangement can prevent deletion of necessary data.

It should be noted that, although tentative laying out for page dividing is applied every time the document analyzing section 33 finds a document element during analysis in the above, the present invention is not limited to this arrangement. Alternatively, tentative laying out and page dividing may be applied at a predetermined time after beginning of the document analysis and before completion of acquisition of all necessary display content data and the document manager 35 begins outputting, or printing, accordingly. This arrangement enables higher speed printing than by a conventional device.

It should also be noted that, although display content data acquired from outside the printing document is all determined as re-downloadable and thus deleted in the above, this determination may be individually made based on information concerning security or a downloading expense, which may be additionally recorded in the data management table. This arrangement can accommodate a case in which it is preferable, in consideration of a security procedure or downloading expenses, to determine even data acquired from the outside as not re-downloadable.

Alternatively, a result of determination as to whether or not display content data is re-downloadable may be recorded in advance in a data management table so that data to delete can be determined with reference to the result.

Although the present invention is applied to a printer in the above, the present invention can also be applied to a print server, a printer driver installed to a personal computer, and so forth.

Further, although an HTML document is referred to as an example in the above, the present invention can obviously be used with respect to a general document, such as HTML and XML, which is written in a description language which allows description of display content data of a document element in the form of reference.

It should be noted that the above embodiment is described only for the purpose of presenting an example, and various modification can be applied to the present invention without departing from the scope of the present invention.

What is claimed is:

1. An image forming device comprising:
   an analyzing section that analyzes an input document containing a plurality of document elements to find the document elements to be tentatively laid out for tentative page dividing;
   a tentative laying out section that tentatively lays out a document on a plurality of pages, the document including the document elements having a reference destination of display content data, the reference destination being a location outside of the input document, or at a location behind the document element in the input document;
   an acquiring section that acquires the display content data from the reference destination;
   a monitoring section that monitors whether the acquiring section acquired all of the display content data to be tentatively laid out on a first page of the plurality of pages;
   a re-laying out section that re-lays out the first page, while the acquiring section continues to acquire all of the display content data to be laid out on the plurality of remaining pages, in response to receiving information indicating the acquiring section has acquired all of the display content data to be tentatively laid out on the first page;
   an output controller that instructs image formation for the first page which has been re-laid out, while the re-laying out section continues to re-lay out the plurality of remaining pages as long as the acquiring section has acquired all of the display content data to be tentatively laid out for all pages which precede the page to be re-laid out; and an image forming section that forms an image corresponding to the first page which has been re-laid out based on the instruction from the output controller, wherein, the tentative laying out section lays out the document on the plurality of pages by using, (a) a rendering size of the display content data used in a re-laying out process to be processed by the re-laying out section when the tentative laying out section has information of the rendering size at a time of finding the document element, and (b) a predetermined tentative size different from the rendering size when the tentative laying out section does not have the information of the rendering size at a time of finding the document element.

2. The image forming device according to claim 1, wherein the re-laying out section divides the first page into a plurality of divided first pages when all of the display content data to be laid out on the first page does not fit in one page and re-lays out the display content data to be laid out on the first page on each of the divided first page.

3. The image forming device according to claim 1, further comprising:
a memory that stores a page management table including information concerning the display content data to be laid out on the plurality of pages,
wherein:
the tentative laying out section records the predetermined tentative size to the page management table as a result of the tentative laying out section lays out the document;
the re-laying out section updates the page management table by replacing the predetermined tentative size with the rendering size; and
the output controller instructs the image formation base on the updated page management table.

4. The image forming device according to claim 1, wherein the document is written in a markup language.

5. The image forming device according to claim 1, further comprising:
a memory that stores the display content data acquired from the reference destination; and
a memory freeing section that deletes the display content data corresponding to the first page after the output controller instructs the image formation for the first page and before the acquiring section acquires all of the display content data to be laid out on the plurality of pages.

6. The image forming device according to claim 5, further comprising:
a data source information storage section that stores information concerning a data source from which each display content data is acquired, wherein the memory freeing section determines, based on the data source information stored in the data source information storage section, whether or not there is a possibility that the display content data used in the first page will be used in the subsequent pages and, when there is no such possibility, deletes the display content data from the memory.

7. The image forming device according to claim 5, further comprising:
a data source information storage section that stores information concerning a data source from which each display content data is acquired, wherein the memory freeing section determines, based on the data source information stored in the data source information storage section, whether or not the display content data used in the first page is re-obtainable and, when the display content data is re-obtainable, deletes the display content data from the work memory.

8. The image forming device according to claim 7, wherein whether or not the display content data is re-obtainable is determined based on whether or not the display content data is acquired from an outside device.

9. An image forming method comprising;
analyzing an input document containing a plurality of document elements to find the document elements to be tentatively laid out for tentative page dividing;
laying out a document on a plurality of pages tentatively, the document including the document elements having a reference destination of display content data;
acquiring the display content data from the reference destination;
monitoring whether all of the display content data to be tentatively laid out on a first of the plurality of pages has been acquired;
re-laying out the first page, while all of the display content data to be laid out on the plurality of remaining pages continues to be acquired, in response to receiving information indicating all of the display content data to be tentatively laid out on the first page has been acquired; and
instructing image formation for the first page which has been re-laid out, while the plurality of remaining pages continue to be re-laid out as long as all of the display content data to be tentatively laid out for all pages which precede the page to be re-laid out has been acquired, wherein the method is performed by a processor.

10. The image forming method according to claim 9, wherein:
dividing the first page into a plurality of divided first pages in the relaying out step when all of the display content data to be laid out on the first page does not fit in one page; and
re-laying out the display content data to be laid out on the first page on each of the divided first page in the relaying out step.

11. The image forming method according to claim 9, wherein,
laying out the document tentatively on the plurality of pages in the laying out step by using; (a) a rendering size to be used in a re-laying out process when the rendering size is known at a time of finding the document element, and (b) a predetermined tentative size different from the rendering size when the rendering size is not known at a time of finding the document element.

12. The image forming method according to claim 11, further comprising:
storing a page management table including information concerning the display content data to be laid out on the plurality of pages,
wherein:
recording the predetermined tentative size to the page management table as a result of the laying out step;
updating the page management table by replacing the predetermined tentative size with the rendering size; and
instructing the image formation base on the updated page management table.

13. The image forming method according to claim 9, wherein the document is written in a markup language.

14. The image forming method according to claim 9, further comprising:
storing the display content data acquired from the reference destination; and
deleting the display content data corresponding to the first page after instructing the image formation for the first page and before acquiring all of the display content data to be laid out on the plurality of pages.

15. A non-transitory computer readable medium storing a program executable by a computer for causing the computer to perform a process for image forming, the process comprising:

analyzing an input document containing a plurality of document elements to find document elements to be tentatively laid out for tentative page dividing;

laying out a document on a plurality of pages tentatively, the document including the document elements having a reference destination of display content data;

acquiring the display content data from the reference destination;

monitoring whether all of the display content data to be tentatively laid out on a first of the plurality of pages has been acquired;

re-laying out the first page, while all of the display content data to be laid out on the plurality of remaining pages continues to be acquired, in response to receiving information indicating all of the display content data to be tentatively laid out on the first page has been acquired; and instructing image formation for the first page which has been re-laid out, while the plurality of remaining pages continue to be re-laid out as long as all of the display content data to be tentatively laid out for all pages which precede the page to be re-laid out has been acquired.

16. The computer readable medium according to claim 15, wherein:

dividing the first page into a plurality of divided first pages in the relaying out step when all of the display content data to be laid out on the first page does not fit in one page; and re-laying out the display content data to be laid out on the first page on each of the divided first page in the relaying out step.

17. The computer readable medium according to claim 15, wherein, laying out the document tentatively on the plurality of pages in the laying out step by using, (a) a rendering size to be used in a re-laying out process when the rendering size is known at a time of finding the document element, and (b) a predetermined tentative size different from the rendering size when the rendering size is not known at a time of finding the document element.

18. The computer readable medium according to claim 17, further comprising:

storing a page management table including information concerning the plurality of document elements to be laid out on the plurality of pages;

recording a result of dividing the document in the page management table;

re-laying out the first page by replacing the predetermined tentative size with the rendering size;

updating the page management table according to a result of re-laying out; and instructing the image formation base on the updated page management table.

19. The computer readable medium according to claim 15, wherein the document is written in a markup language.

20. The computer readable medium according to claim 15, further comprising:

storing the display content data acquired from the reference destination; and deleting the display content data corresponding to the first page after instructing the image formation for the first page and before acquiring all of the display content data to be laid out on the plurality of pages.

21. The image forming device according to claim 1, wherein the display content data exists on a network and the acquiring section acquires the display content data from the reference destination through the network.

22. The image forming method according to claim 9, wherein the display content data exists on a network and the acquiring of the display content data from the reference destination is through the network.

23. The computer readable medium according to claim 15, wherein the display content data exists on a network and the acquiring of the display content data from the reference destination is through the network.

24. The image forming device according to claim 1, wherein every time the display content data of all document elements are laid out on a given page, printing is applied for that page.

* * * * *